(No Model.) 2 Sheets—Sheet 2.
J. T. McLELLAN.
ROCKING ASH PAN.
No. 556,365. Patented Mar. 17, 1896.
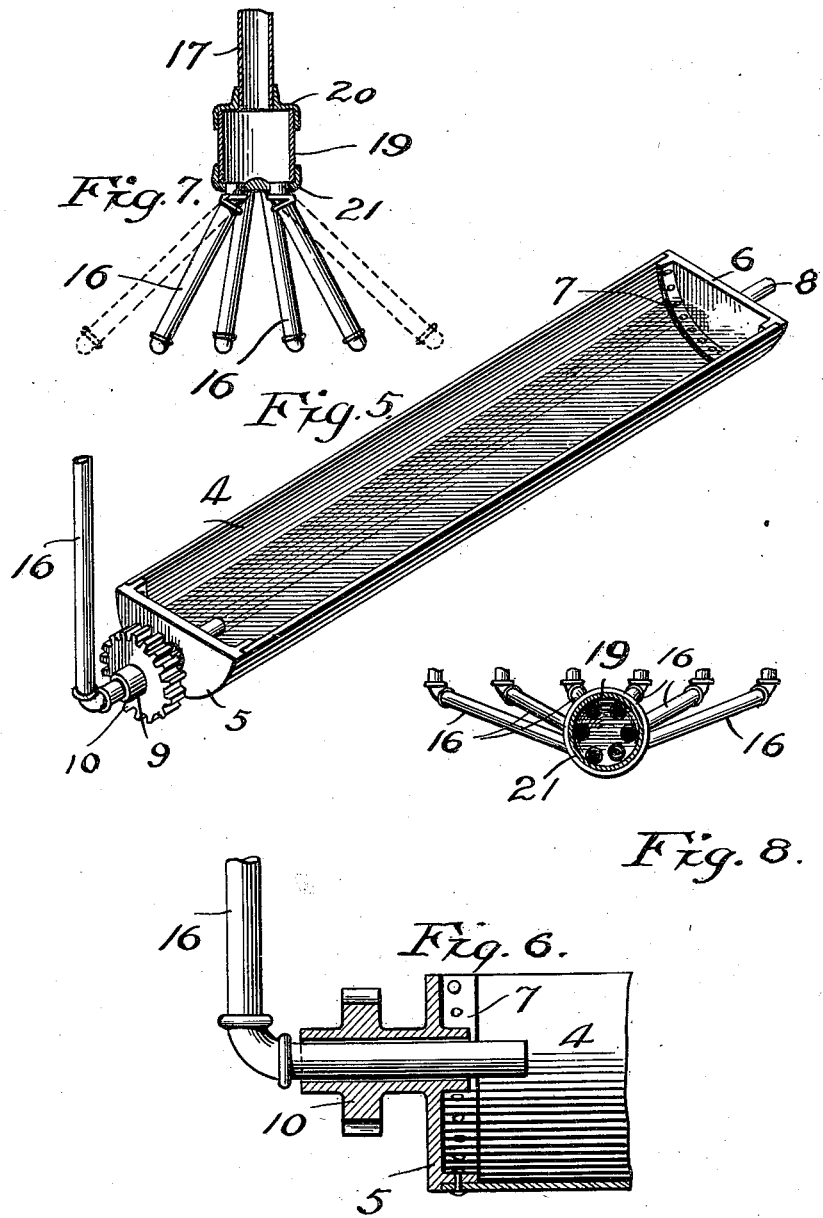
Witnesses:
C. E. Van Doren.
Richard Paul.
Inventor:
John T. McLellan.
By Paul & Hawley
his Attorneys.

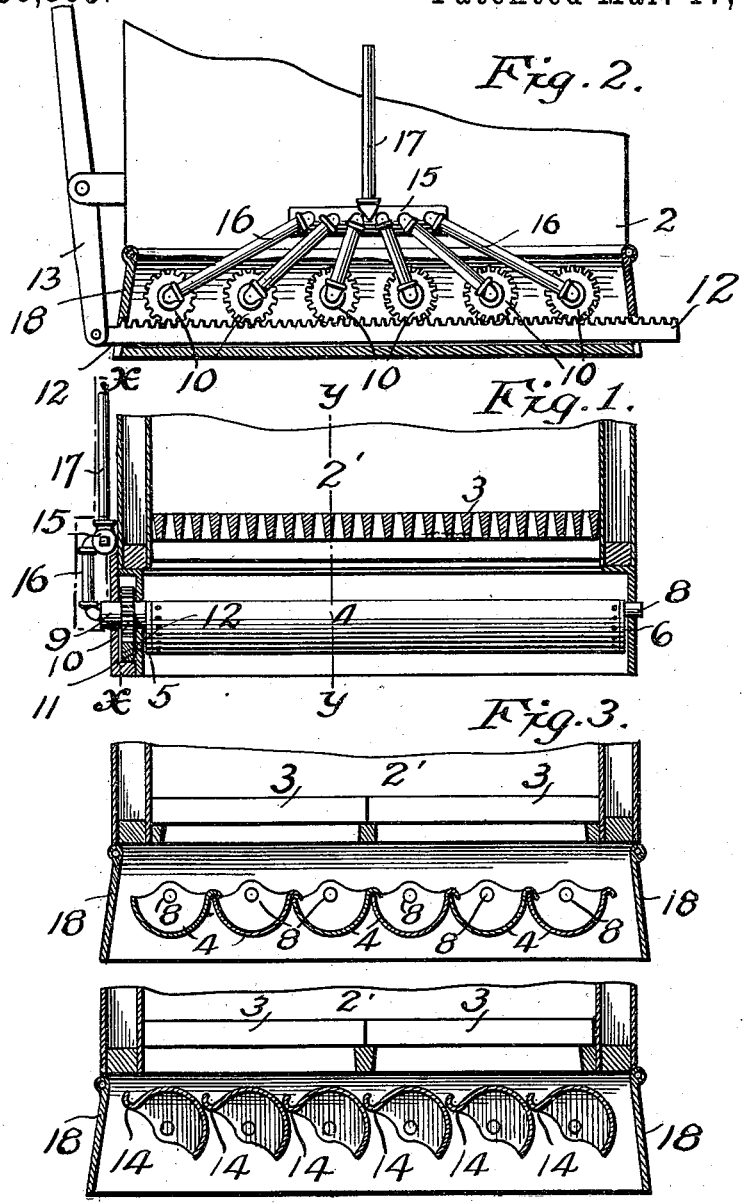

UNITED STATES PATENT OFFICE.

JOHN T. McLELLAN, OF BOZEMAN, MONTANA, ASSIGNOR OF ONE-HALF TO JOHN A. LUCE, OF SAME PLACE.

ROCKING ASH-PAN.

SPECIFICATION forming part of Letters Patent No. 556,365, dated March 17, 1896.

Application filed March 30, 1895. Serial No. 543,796. (No model.)

*To all whom it may concern:*

Be it known that I, JOHN T. McLELLAN, of Bozeman, Gallatin county, Montana, have invented certain new and useful Improvements in Rocking Ash-Pans for Furnaces, of which the following is a specification.

My invention relates to ash-pans for furnaces, and particularly for furnaces of locomotive-boilers; and the object of my invention is to provide an ash-pan for use beneath the grate of a locomotive, which ash-pan will practically close the space beneath the grate and receive the ashes and live coals falling through the grate, while being adapted to be quickly turned or shifted to discharge the ashes therefrom.

The object of my invention is to provide an ash-pan of the class above described, and, further, one wherein a quantity of water may be carried to extinguish the sparks and live coals falling from the grate, so that no hot coals will be dumped upon the railroad-track to endanger the rails.

A further object of my invention is to provide an ash-pan of this class, which pan will be of an extremely simple, cheap, and durable construction, and, further, a pan which may be readily and easily operated.

To this end my invention consists in a dumping ash-pan comprising a series of parallel troughs adapted to contain a small amount of water arranged to be simultaneously inverted.

Further, my invention consists in details of construction and in combinations, all as hereinafter described and particularly pointed out in the claims.

Figure 1 is a side view of an ash-pan embodying my invention. Fig. 2 is an end view of the same on the line $x\ x$ of Fig. 1. Fig. 3 is a sectional view on the line $y\ y$ of Fig. 1. Fig. 4 is a similar view, showing the position of the pans when dumped. Fig. 5 is a perspective view of one of the pans. Fig. 6 is a partial sectional view of one end of one of the pans, showing the means for supporting the end thereof, and through which the water passes to the trough or pan. Fig. 7 shows a modified form of the horizontal pipe arranged above the pans. Fig. 8 is a sectional view of the same, showing the interior of the pipe or receptacle, from which the smaller pipes radiate.

In the drawings, 2 represents the shell of the boiler, within which is arranged the fire-box 2', supported from the inner wall of the shell by bolts or in any other suitable way. In the lower part of the fire-box is arranged the grate 3, and beneath the grate the walls of the fire-box are extended down and out to a point flush with the wall of the shell, as shown in Fig. 1. This construction prevents the ashes and clinkers dropping into the gearings and bearings at each end of the pans, as hereinafter described.

Supported in bearings in the walls of the fire-box beneath the grate are a series of horizontally-arranged pans or troughs, semicylindrical in shape and comprising the curved part 4, made of cast or sheet metal, preferably the latter, and the cast-metal ends 5 and 6 having the flanges 7, to which the ends of the part 4 are respectively riveted or bolted, as desired.

The end 6 is provided with a stud or projection 8 formed integrally therewith or not, as desired, which extends through an opening in the adjacent wall of the fire-box and serves as a support for one end of the pan.

The end 5 is provided with a hollow stud 9, having the gear-wheel 10 formed integrally upon its outer end.

The extreme outer end of the stud 9 rests in bearings in the wall of the fire-box, and a partition 11 is arranged between the gear and the end of the pan, forming a space at the bottom of which is arranged the rack-bar 12 in engagement with each of the gear-wheels 10. To the outer end of the bar 12 is pivoted a vertical lever 13, which extends up to a point within reach of the fireman in the cab. Each of the pans is provided with a longitudinal lip 14 extending the entire length of the pan and resting upon the edge of the adjacent pan when the device is in use. This lip serves to prevent the pans from tilting too far in one direction, and also to prevent leakage between the pans when in use. Above the end of the troughs or pans is arranged a horizontal pipe 15, from which radiate a series of pipes 16 which extend down and into the adjacent end of the pans through the hollow stud 9.

A vertical pipe 17 extends up from the pipe 15 to the water-tank from which water is obtained for filling the pans. Suitable means are provided in the cab for regulating the flow of water through the pipes. At each end of the fire-box, above the rack-bar 12, is arranged a swinging door 18 which may be raised up at any time to permit access to the pans.

The operation of the device is as follows: The pans are partially filled with water from the tank, and as the ashes and coals fall from the grate they drop into the water in the pans or troughs, and thereby all danger of burning the ties or setting fire to wooden bridges is avoided. When the pans become filled or at any other time by throwing the lever 13 the pans will be thrown into the position shown in Fig. 4 and quickly emptied of their contents either while the engine is moving or while stationary.

As shown in Figs. 7 and 8, I may provide in place of the horizontal pipe 15 a cup-shaped receptacle 19, having the threaded upper and lower caps, 20 and 21, provided with openings into which the vertical pipe 17 and the pipes 16 are respectively screwed. I prefer to use this construction, for by its use the water as it flows down through the pipe 17 will be more evenly distributed to the pans or troughs through the pipes 16.

Having thus described my invention, I claim as new and desire to secure by Letters Patent—

1. A rocking ash-pan, comprising a series of pans arranged beneath the grate, the hollow studs provided on the ends of said pans, and supported in bearings in the wall of the fire-box, said pans being provided on their upper edge with a lip or flange to rest upon the edge of the adjoining pan, means for rocking said pans, and a pipe leading from the water-tank and having branches extending into said pans through said hollow studs for the purpose set forth.

2. A rocking ash-pan, consisting of a series of pivotally-supported pans or troughs arranged beneath the grate, each of said pans comprising the part 4, the end 5 having the hollow outwardly-projecting stud 9, the gear carried thereby, the end 6 having the stud 8, the rack-bar beneath said pans in position to engage the gear carried by said stud, means for operating said rack-bar to tilt said pans, a horizontal pipe 15 arranged above the end of said pans, a series of pipes 16 radiating therefrom and extending through the hollow studs 9 into the respective pans and means connecting said horizontal pipe with the water-tank for the purpose set forth.

In testimony whereof I have hereunto set my hand this 14th day of March, A. D. 1895.

JOHN T. McLELLAN.

In presence of—
WILLIAM A. HARPER,
WILLIAM R. C. STEWART.